(12) United States Patent
Haustein et al.

(10) Patent No.: US 8,423,737 B2
(45) Date of Patent: Apr. 16, 2013

(54) SYSTEMS AND METHODS FOR VIRTUALIZING STORAGE SYSTEMS AND MANAGING DATA INDEPENDENTLY

(75) Inventors: Nils Haustein, Soergenloch (DE); Thorsten Krause, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 12/909,764

(22) Filed: Oct. 21, 2010

(65) Prior Publication Data

US 2011/0153965 A1 Jun. 23, 2011

(51) Int. Cl.
*G06F 12/00* (2006.01)
*G06F 12/16* (2006.01)

(52) U.S. Cl.
USPC ............. 711/162; 711/E12.001; 711/E12.103

(58) Field of Classification Search .................. None
See application file for complete search history.

(56) References Cited

U.S. PATENT DOCUMENTS

| | | | |
|---|---|---|---|
| 6,353,878 | B1 | 3/2002 | Dunham |
| 2005/0080992 | A1 | 4/2005 | Massey et al. |
| 2006/0253549 | A1 | 11/2006 | Arakawa et al. |
| 2008/0091896 | A1 | 4/2008 | Usami |
| 2009/0063765 | A1 | 3/2009 | Kottomtharayil et al. |

OTHER PUBLICATIONS

Eastern Computer Exchange, "Mainframe Tape Virtualization (Tape-To-Disk)," URL .http://www.ecei.com/mft2d.html, printed on Aug. 26, 2009, 2 pages.
Lauren Whitehouse, "Enabling Tiered Storage Through Tape Virtualization: Delivering More Performance, Reliability and Efficiency At Lower Cost," http://www.thefreelibrary.com/Enabling+tiered+storage+through+tape+virtualization:+delivering+more...-a0134577399, Computer Technology Review, Mar. 1, 2005, 8 pages.
Frank Bunn et al., "SNIA Technical Tutorial—Storage Virtualization," Storage Networking Industry Association (SNIA), 2004, 25 pages.

*Primary Examiner* — Kevin Verbrugge
(74) *Attorney, Agent, or Firm* — Griffiths & Seaton PLLC (57) ABSTRACT

Method, data processing systems, and computer program products are provided for virtualizing and managing a storage virtualization system (SVS) in a storage management architecture. Source data is copied from the source storage media to target data in a target storage media based on a predefined copy policy in a copy mapping table. A relation between the source data and the target data is tracked in a copy mapping table. It is determined if a copy of the requested data exists using the copy mapping table. A least utilized storage system having a copy of the requested storage media is determined. Access to the requested storage media in the least utilized storage system is tested. If access is not possible, access to a copy of the requested storage media in another storage system is provided by updating a frontend-backend mapping table and forwarding all data access commands to the other system.

13 Claims, 6 Drawing Sheets

Architecture 200

SYSTEMS AND METHODS FOR VIRTUALIZING STORAGE SYSTEMS AND MANAGING DATA INDEPENDENTLY

CROSS-REFERENCE TO RELATED APPLICATIONS

This application claims priority to European Patent Application No. 09179601.1, filed Dec. 17, 2009, and entitled "System and Methods for Virtualizing Storage Systems of Different Kinds and Providing Methods for Managing Data Independently."

BACKGROUND

1. Field of the Invention

The present invention relates to storage management, and more particularly to a system for virtualizing and managing storage devices, such as storage virtualization systems (SVS), in a storage management architecture.

2. Description of the Related Art

Prior art storage management architectures do not provide a copy function and subsequent methods for high availability, load balancing, and tiered storage which are independent of the host systems and which are applicable to a variety of storage systems including disk systems and tape libraries.

There is a need in the art to address the aforementioned problem.

SUMMARY OF THE INVENTION

In one embodiment, a method is provided for virtualizing and managing a storage virtualization system (SVS) in a storage management architecture. The SVS is connected to one or more storage systems. The one or more storage system includes a plurality of storage media. Upon completion of write operations to a source storage media, source data is copied from the source storage media to target data in a target storage media based on a predefined copy policy in a copy mapping table. Upon completion of the copying of the source data, a relation between the source data and the target data is tracked in a copy mapping table. Upon reception of a read command for requested data to a requested storage media, it is determined if a copy of the requested data exists using the copy mapping table. A least utilized storage system which holds a copy of the requested storage media is determined. Responsive to the determination of the least utilized storage system, access to the requested storage media in the least utilized storage system is tested. If access to the requested storage media in the least utilized storage system is not possible, access to a copy of the requested storage media in another storage system is provided by updating a frontend-backend mapping table and forwarding all data access commands to the other storage system.

In another embodiment, a data processing system is provided for virtualizing and managing a storage virtualization system (SVS) in a storage management architecture. The SVS is connected to one or more storage systems. The one or more storage system includes a plurality of storage media. The data processing system includes at least one processor device, operable in the storage management architecture. The at least one processor device is adapted for upon completion of write operations to a source storage media, copying source data from the source storage media to target data in a target storage media based on a predefined copy policy in a copy mapping table. Upon completion of the copying of the source data, a relation between the source data and the target data is tracked in a copy mapping table. Upon reception of a read command for requested data to a requested storage media, it is determined if a copy of the requested data exists using the copy mapping table. A least utilized storage system which holds a copy of the requested storage media is determined. Responsive to the determination of the least utilized storage system, access to the requested storage media in the least utilized storage system is tested. If access to the requested storage media in the least utilized storage system is not possible, access to a copy of the requested storage media in another storage system is provided by updating a frontend-backend mapping table and forwarding all data access commands to the other storage system.

In a further embodiment, a computer program product is provided for virtualizing and managing a storage virtualization system (SVS) in a storage management architecture. The SVS is connected to one or more storage systems. The one or more storage system includes a plurality of storage media. The computer program product includes a computer-readable storage medium having computer-readable program code portions stored therein. The computer-readable program code portions include first, second, third, fourth, fifth, and sixth executable portions. The first executable portion is adapted for, upon completion of write operations to a source storage media, copying source data from the source storage media to target data in a target storage media based on a predefined copy policy in a copy mapping table. The second executable portion is adapted for, upon completion of the copying of the source data, tracking a relation between the source data and the target data in a copy mapping table. The third executable portion is adapted for, upon reception of a read command for requested data to a requested storage media, determining if a copy of the requested data exists using the copy mapping table. The fourth executable portion is adapted for determining a least utilized storage system which holds a copy of the requested storage media. The fifth executable portion is adapted for, responsive to the determination of the least utilized storage system, testing access to the requested storage media in the least utilized storage system. The sixth executable portion is adapted for, if access to the requested storage media in the least utilized storage system is not possible, providing access to a copy of the requested storage media in another storage system by updating a frontend-backend mapping table and forwarding all data access commands to the other storage system.

In yet a further embodiment, a data processing system is provided for virtualizing and managing a storage virtualization system (SVS) in a storage management architecture including one or more host systems connected to the SVS. The SVS is connected to one or more storage systems. The one or more storage system includes a plurality of storage media. The data processing system includes a SVS located in the data path between the one or more host systems and the one or more storage systems, means for managing a frontend-to-backend mapping table, the frontend-to-backend mapping table mapping backend resources to frontend resources, means for managing a copy mapping table, the copy mapping table mapping a primary storage media to one or more secondary storage media and a copy policy where a storage media is identifiable by a serial number, a logical disk is identifiable by a logical unit number physically represented by one or more hard disks or solid state disks, or an optical disk is identifiable by a unique volume identifier, and means for managing a migration mapping table, the migration mapping table mapping a source storage media to a migration storage media and a migration policy.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

According to one aspect of the present invention, a storage management architecture is provided which includes one or more host systems connected to a storage virtualization system (SVS), which has one or more storage systems in form of disk systems and/or one or more tape libraries connected thereto. The host systems issue commands to the storage systems, such as SCSI read and write commands, which are intercepted by the SVS and processed by methods described herein. Disk systems and tape libraries may be represented by either physical or virtual systems and/or systems performing additional functions such as data deduplication.

Figure 1:
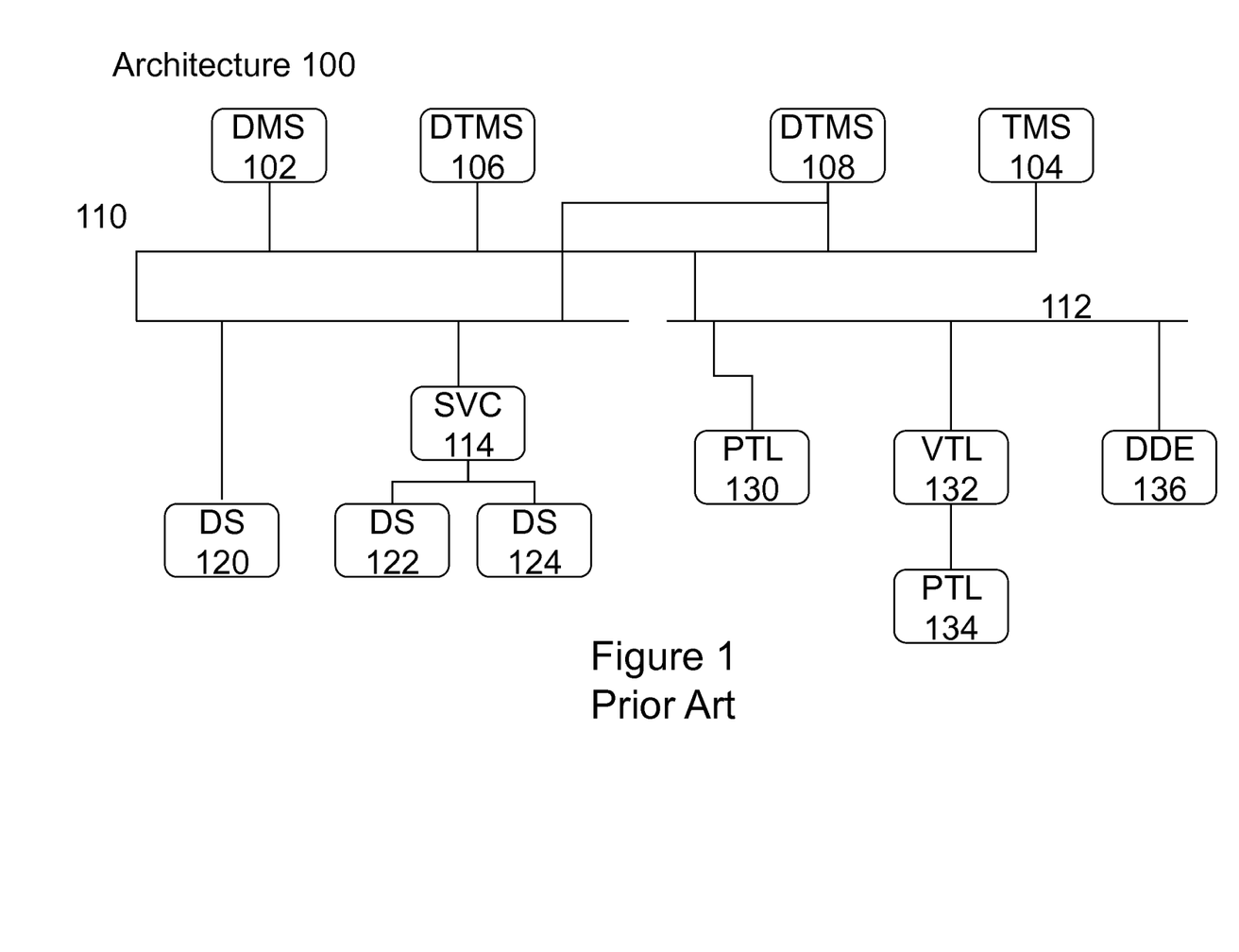
FIG. 1 is a schematic depiction illustrating the most basic structural components of a prior art storage management architecture.

A typical prior art storage management architecture will be described with reference to FIG. 1. Storage management architecture 100 comprises various host systems (102, 104, 106, 108) that write or read data to and from storage media (120, 122, 124, 130, 132, 136). Host systems are differentiated depending on the storage media they are using, such as disk (120, 122, 124), tape (130, 132, 136) or both. Therefore, host systems are separated into disk management systems (DMS) 102, tape management systems (TMS) 104 and disk-tape management systems (DTMS) 106, 108. The host system runs applications which essentially write and read data to and from storage media and keep an internal catalogue mapping data to storage media.

In the storage management architecture 100, there may be separated networks used for accessing data on disk and on tape. Therefore, DMS 102 is connected to disk-network 110 and TMS 104 is connected to tape-network 112. DTMS 106 and 108 have the ability to use both disk and tape. Therefore, DTMS 106 and 108 are connected to both networks 110 and 112. Disk systems (DS) 120,122,124 are attached to disk-network 110 and tape libraries 130,132,136 are attached to tape-network 112. Networks 110 and 112 may be represented by a Storage Area Network (SAN) which is based on the Fibre Channel Protocol (FCP). The I/O protocols might be based on the ANSI standard SCSI T10 command set which is for example mapped on the fibre channel protocol.

Networks 110 and 112 may also be one and the same network where DMS are mapped to disk systems and TMS are mapped to tape systems.

In a prior art storage management architecture, storage media may be either a logical disk or a tape. A logical disk exists within a disk system (DS) like a DS 120, 122 or 124. A tape is used in a tape library like Physical Tape Library (PTL) 130, or Virtual Tape Library (VTL) 132, PTL 134 or data deduplication engine (DDE) 136. Logical disk and tapes are subsequently also referred to as storage media.

A disk system 120, 122,124, such as the IBM® DS4700, comprises multiple hard disks and a common disk control unit.

According to user needs, there is the possibility to group hard disks together to logical disks of variable size, which are represented towards the host system. A logical disk is a block oriented I/O device, which means that if a DMS wants to read/write data from/to a logical disk, the DMS uses SCSI commands to select the block addresses of the logical disk where the data shall reside and essentially reads/writes the data from/to that block addresses of the logical disk.

A disk-network 110 may be enhanced by a storage virtualization controller (SVC) 114, such as the IBM® SVC. A SVC creates an abstraction layer between DMS and disk systems. The SVC is capable of migrating and copying data between different disk systems. The SVC represents logical disks to the DMS (102) or DTMS (106, 108) and maps the logical disks internally to the logical disk of the appropriate physical disk system (120,122,124). A DMS is never aware of the existence of a SVC, therefore the DMS also doesn't know on which disk system the logical disk is stored physically.

A tape library 130, 132, 134, 136 comprises medium changer, tape drives and tape cartridges. A tape library may be either physical or virtual and provide additional functions like data deduplication. Therefore three types of tape libraries exist: physical tape library (PTL) 130, virtual tape library (VTL) 132 with an optional PTL 134 in the backend and deduplication engine (DDE) 136.

Physical tape libraries (PTL) 130—for example the IBM® TS3500—comprise a plurality of physical tape drives connected to network 112, a plurality of physical storage slots which are used to store a plurality of physical tape cartridges (physical tapes) and a medium changer which is used to move tape cartridges from storage slots to tape drives and vice versa.

A Virtual Tape Library (VTL) 132 is a disk-based tape library that offers virtual tape resources which are emulated by a virtualization software executed by VTL 132. Tape operations from a TMS point of view are the same between a VTL 132 and PTL 130. The only difference between a VTL 132 and PTL 130 is that the VTL emulates the virtual resources by means of software and the virtual tape cartridges (virtual tapes) are stored on a disk system comprised in the VTL. The VTL 132 emulates virtual tape drives and virtual storage slots which are used to store virtual tapes. The VTL also provides a virtual medium changer which is used to virtually move virtual tapes from virtual slots in virtual tape drives and vice versa.

A VTL 132 may include a PTL 134 in the back-end and may provide additional functions for managing the virtual tapes stored in the disk system of a VTL. One function is an integrated backup function which copies the data from a virtual tape in VTL 132 (stored on disk) to a physical tape in PTL 134. Another function is a tiered storage function where the data is migrated from virtual tape to physical tape based on certain predetermined storage policies. Yet another function provides high availability where the data residing on disk and tape is provided from a storage location which is available. In other words, if the data on disk is not available it may still be accessed on tape which provides high availability.

A deduplication engine (DDE) 136 according to the prior art is similar to VTL 132 but provides some additional data deduplication functionality. Data deduplication is a process which identifies identical blocks of data within a set of data and stores it only once. This greatly contributes to save storage capacity. The DDE 136—like a VTL 132—emulates virtual resources like virtual tape drives, virtual storage slots for storing virtual tapes and a virtual medium changer which is used to virtually move virtual tapes from virtual slots in virtual tape drives and vice versa. Virtual tapes which are written and read by a TMS such as 104 are deduplicated and stored on a disk system included in the DDE 136. A DDE 136 according to prior art does usually not provide functions to migrate, copy or export data to physical tape.

From a TMS 104 point of view it doesn't make a difference if it uses tapes within a PTL 130, a VTL 132 or a DDE 136. Tape operations are all the same and the TMS isn't even aware if it writes to a PTL, VTL or DDE. When a TMS wants to read/write date from/to a tape it first sends a command to a tape library instructing the medium changer to move a tape cartridge into a tape drive. The medium changer executes the command and when the tape cartridge is loaded in a tape drive, the TMS may read or write data to that tape cartridge using prior art SCSI commands.

A DTMS 106, 108 is capable of using both logical disk and tapes (virtual and physical) to read/write data. Therefore a DTMS may provide functions in regards to high availability by using copies on both disk and tape. Also a DTMS may provide tiered storage functionality by migrating data from disk to tape or vice versa. A DTMS uses exactly the same SCSI access methods to disk and tape like a DMS or TMS, but consolidates this functionality within one host system.

Storage management architecture 100 according to prior art as described above has some significant shortcomings in regards to high availability with multiple storage media copies, load balancing, and tiered storage.

First, prior art disadvantages in relation to high availability with multiple storage media copies will be described next below:

High availability in a prior art storage management architecture 100 may be achieved by having multiple storage devices such as PTL 130, VTL 132 and DDE 136 and disk systems 120, 122 and 124 connected to a host system such as DMS 102, DTMS 106, 108 or TMS 104 via the networks 110 and 112. Host systems write/read data to/from storage media which may be tapes denoted by a VOLSER and located in a tape library (130, 132, 136) or logical disk denoted by a logic unit number and located in a disk system (120, 122, 124). Host systems may further create copies of source storage media onto target storage media whereby a DMS may only create copies of logical disks on disk system 120, 122 and 124, a TMS may only create copies of tapes on tape systems 130, 132, 136 connected to it. A DTMS is additionally capable of copying data from logical disks of disk systems (120, 122, 124) to tapes in tape systems (130, 132 and 136) and vice versa. When a copy is created, high availability may be achieved, because if the primary copy of a storage media is unavailable, the host system may access the secondary copy on another storage media. However, the disadvantage of this operation is that the host system carries the workload for creating copies of storage media because host systems have other workload-intensive tasks to handle. In addition, host systems may only create copies on storage devices which are connected to the host system and it requires high administrative overhead to connect all storage devices to all host systems.

A VTL 132 with a PTL 134 attached in the backend may perform the copy of a source virtual tape to a target physical tape in PTL 134 and provide subsequent high availability independent of the host system. This would relieve the burden from the host system. However capability is limited to the VTL 132 and it is not applicable for disk system 120, 122 and 124 and PTL 130 and DDE 136. Thus a heterogeneous environment with multiple types of storage systems may not benefit from these functions and puts the burden on the host system.

Next, the disadvantages of the prior art with respect to load balancing will be discussed.

In a storage management architecture 100 where multiple storage devices such as tape libraries 130, 132, 136 and disk systems 120, 122 and 124 are attached to multiple host systems such as 102, 104, 106, 108 it is not possible to implement means of load balancing. For example if TMS 104 wants to read data from a tape with VOLSER 123456 in PTL 130 and PTL 130 is already used by DTMS 108 and 106 then TMS 104 may not perform well due to a high load on PTL 130. Thus there is no way for TMS 104 to determine that DTMS 106 and 108 are already accessing PTL 130 in order to use a secondary copy of tape 123456 within another tape library. This yields in performance degradations for PTL 130 while VTL 132 and DDE 136 are not used.

Finally, the disadvantages of prior art in respect of tiered storage will be discussed.

Tiered storage means the migration of data from one storage medium to another. More particular, in a storage management architecture 100 it is desirable to migrate data from a logical disk within disk system 120, 122 or 124 to a tape within tape library 130, 132 or 136. This may only be accomplished by the host systems which are connected to the respective storage systems. So DMS 102 may only migrate logical disks from one disk system such as 120 to another disk system such as 122, but is not able to migrate the data to a tape within a tape library (130, 132, 136). Likewise TMS 104 may only migrate the data from one tape within a tape library such as DDE 136 to another tape within another tape library such as PTL 130. DTMS 106 and 108 may migrate the data from a logical disk within a disk system such as 124 to a tape within a tape library such as PTL 130. However, the migration of data puts additional workload on the host systems (102, 104, 106 and 108). In addition the tiered storage migration is not possible to all storage systems, because a given host system may only address the storage systems which are connected to it.

According to one aspect of the present invention, improved methods and respective systems for virtualizing storage systems are provided. This is achieved by the features stated in enclosed independent claims, basically by providing copies of storage media and performing high availability, load balancing and tiered storage functions independently of the host systems. The methods include the steps of creating a copy of the data being written to storage systems and providing subsequent high availability, load balancing and tiered storage functions.

Further advantageous arrangements and embodiments of the invention are set forth in the respective subclaims. Reference should now be made to the appended claims.

According to one of its basic aspects, the present invention discloses a storage virtualization system (SVS) which virtualizes storage systems of different storage technologies (disk, tape, optical, solid state disk), whereby host systems are using storage media located in such storage systems for reading and writing data; the storage virtualization system is characterized by a) being located in the data path between host systems and storage systems (disk, tape, optical, SSD), b) managing a frontend-to-backend mapping table, which maps backend resources to frontend resources, c) managing a copy mapping table mapping a primary storage media to one or more secondary storage media and a copy policy where a storage media may be a tape identified by a serial number (VOLSER) or a logical disk identified by a logical unit number (LUN) which is physically represented by one or more hard disks or solid state disks, or an optical disk identified by a unique volume identifier, such as CD or DVD or also a holographic storage medium, and d) managing a migration mapping table mapping a source storage media to a migration storage media and a migration policy.

The storage virtualization system performs methods characterized by the following steps: a) upon completion of write operations to a storage media—such as a tape or a logical disk—copying data of the source storage media to a target storage media based on a predefined copy policy in the copy mapping table, b) upon completion of that copy process tracking relation between the source and the target data in a copy mapping table, c) upon reception of a read command to a storage media (such as a logical disk or a tape) determining if a copy of the requested data exists using the copy mapping table, e) determining the storage system which holds a copy of the requested storage media and is least utilized, f) responsive to this determination testing the access to the storage media in the least utilized storage system, and g) if access to the storage media in the least utilized storage system is not possible, provide access to another copy of the storage media within another storage system by updating the frontend-backend mapping table and forwarding all data access commands to the other storage system.

The storage virtualization system further provides methods for tiered storage by migration of data which is characterized by the following steps: a) tiered storage policies are configured in a migration mapping table pertaining to the storage virtualization system mapping a source storage media to a target storage media and a migration policy, b) determining if a migration policy condition is true, c) responsive to this migration policy condition determine source storage media and target storage media, d) determining if a copy relation between source storage media and migration storage media exists using the copy mapping table, and e) if the relation exists removing the data on the source storage media and otherwise copying the data of the source storage media to the migration storage media and upon completion removing the data on the source storage media and updating the migration mapping table.

The storage media referred to herein may basically be of any physical type, i.e., one or more hard disks or solid state disks, or an optical disk such as CD or DVD, or also a holographic storage medium.

Figure 2:
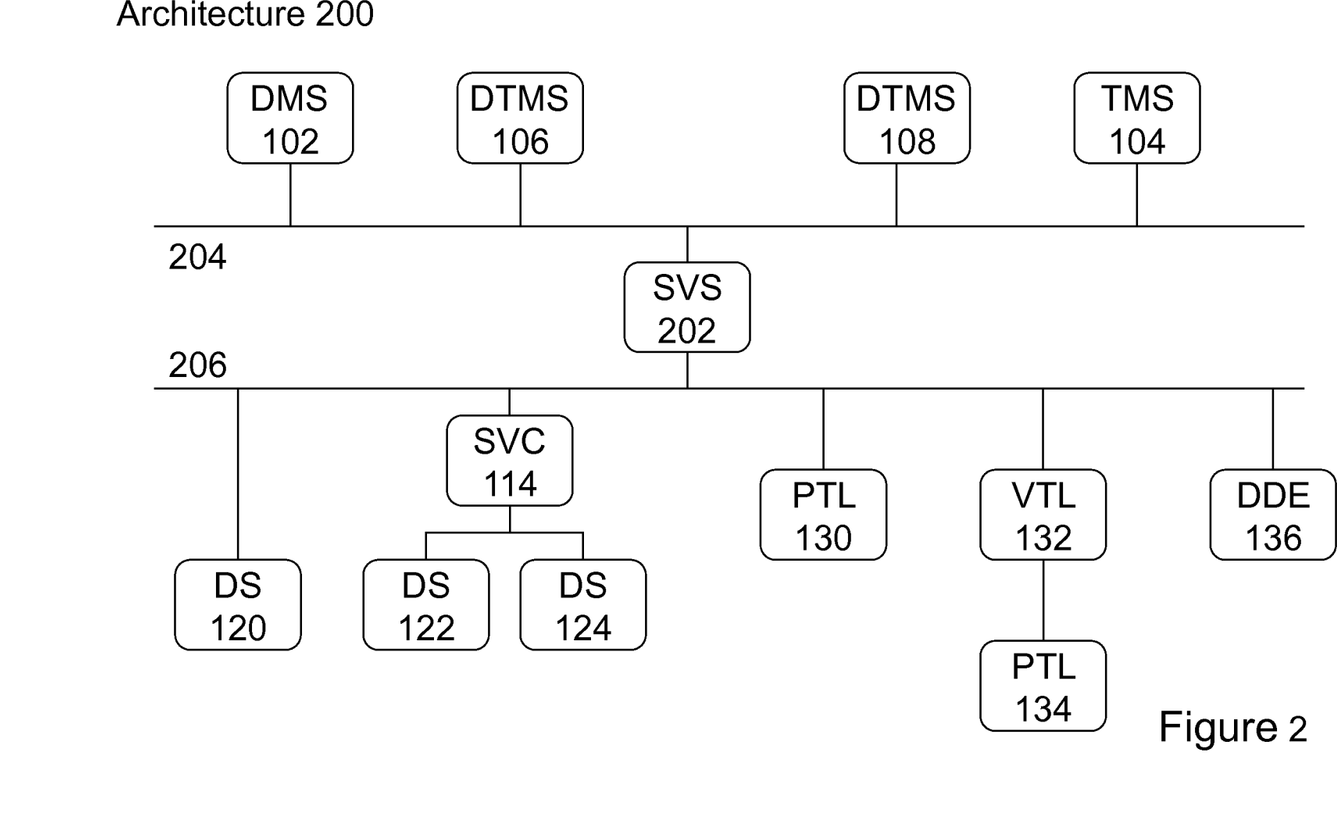
FIG. 2 is a schematic depiction illustrating the most basic structural components of a storage management architecture including a storage virtualization system, according to one embodiment.

With general reference to the figures, and with special reference now to FIG. 2, the basic storage management architecture 100 (FIG. 1) is extended to the storage management architecture 200 by the SVS 202, as described herein, which is located in the data path between host systems 102, 104, 106, 108 and the disk systems 120, 122, 124 and the storage virtualization system 114 and the tape libraries 130, 132 and 136. SVS 202 is connected to host network 204 in the frontend which provides connectivity to the host systems. Network 204 may be a one common network or separated networks like disk-network 110 and tape-network 112 in FIG. 1. In the backend, SVS 202 is connected to network 206 which provides connectivity to all storage systems. Network 204 and 206 may be one and the same network and use the same protocol, such as fibre channel protocol with the SCSI command set. They may also be distinct networks for performance reasons.

Figure 3:
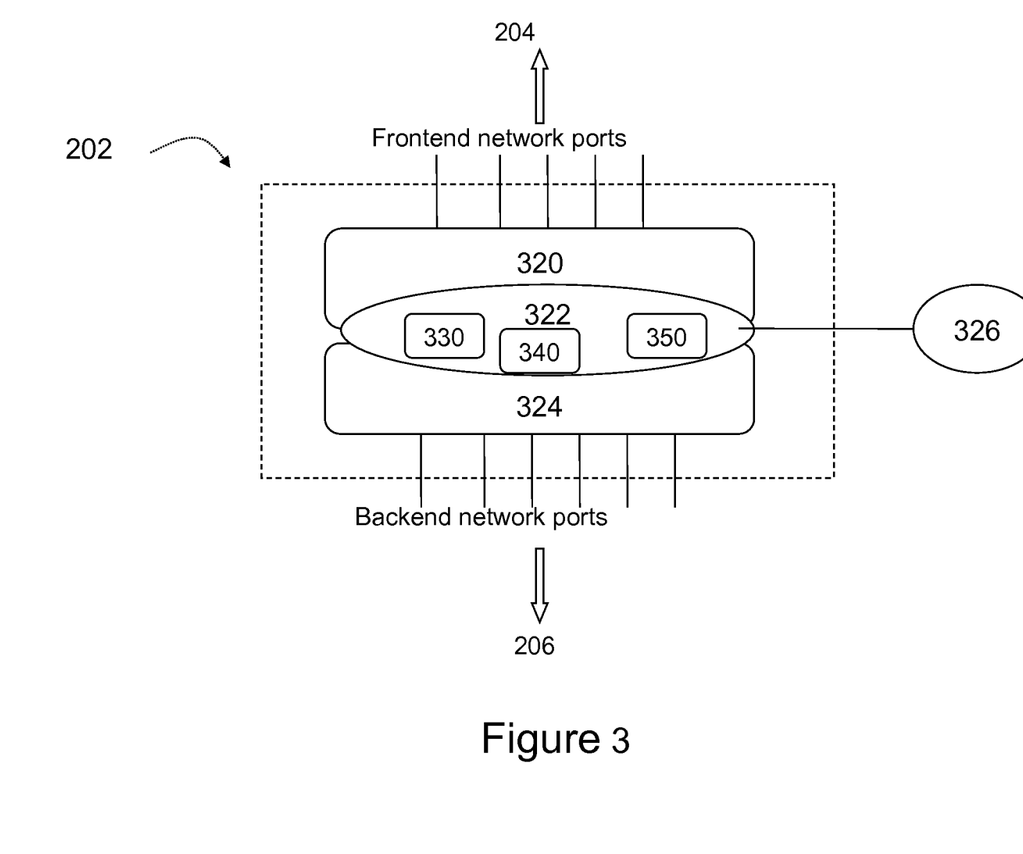
FIG. 3 is a schematic depiction illustrating the most basic structural components of a storage virtualization system, according to one embodiment.

With reference to FIG. 3, SVS 202 includes a frontend engine 320, a logic 322, a backend engine 324 and an administrative interface 326. The following legend is valid: 204 denotes a Front-End (FE) network; 206 denotes a Back-End (BE) network; 320 denotes a FE engine; 322 denotes a SVS logic; 324 denotes a BE engine; 326 denotes an administration interface; 330 denotes a FE-BE mapping table; 340 denotes a copy mapping table; and 350 denotes a migration mapping table.

Frontend engine 320 includes network ports which are connected to network 204 (FIG. 2). The frontend engine emulates the storage devices to the host systems which are seen and provided by the backend engine 324 and which are configured in the frontend-backend mapping table 330. The frontend engine 320 decouples the storage devices in the backend (120, 122, 124, 130, 132, 136 in FIG. 2) from the host systems. Host systems may access the devices emulated by the frontend engine just like normal storage systems according to prior art. The frontend engine is able to intercept certain commands—such as SCSI commands—sent by a host system to a frontend device. Additionally, the frontend engine allows to transparently switch backend devices for one frontend device when required by the methods described herein. For example, if the host system "sees" a tape in PTL 130 the frontend engine 320 and the SVS logic 322 may redirect (switch) the access to a tape of the same type in VTL 132 and the frontend engine will pass all I/O to the VTL 132.

The backend engine 324 includes network ports which are connected to network 206 (FIG. 2). The backend engine provides access to the storage systems in the backend such as disk system 120, 122, 124 and tape libraries 130, 132 and 136 via network 206. The backend engine discovers all backend devices and their type and identifier by using standard SCSI commands such as the SCSI inquiry command and provides all backend devices to the frontend-backend mapping table.

The administrator interface 326 allows the administrator of the SVS 202 to configure frontend-backend device mapping, copy policies and migration policies within the SVS logic 322. Administrative interface 326 might be represented by a graphical user interface including the appropriate graphical and logical elements.

The SVS logic 322 manages the frontend-backend mapping table 330, the copy mapping table 340 and the migration mapping table 350. It therefore integrates into the frontend and backend engine by means of communication. This means the SVS logic communicates with frontend and backend engine as outlined in processes 400, 500 and 600. Furthermore the SVS logic performs the methods using these tables and the frontend and backend engine.

The frontend-backend mapping table 330 (i.e., Table 1) maps the backend devices which are identified by a unique identifier according to prior art to frontend devices:

TABLE 1

| Backend Device | Frontend Device | Alternative backend Device | Backend Tapes |
|---|---|---|---|
| Lib 123456, drive 654321 WWPN 678901, LUN 23 | Lib 123456, drive 654321 WWPN 678901, LUN 23 | Lib 123456, drive 736456 | A12345-A23456 N/A |
| Lib 123456, drive 736456 | | | B10000-B10010 |

TABLE 2

| Source Medium | Target Medium | Copy Policy | Status |
|---|---|---|---|
| Lib 12345 (136) Tape A12345 | Lib 67890 (130) Tape B12345 | When full | Done |
| WWPN 678901, LUN 23 | WWPN 13579, LUN 12 | Always | Pending |
| WWPN 798793, LUN 3 | Lib 45678 (132) Tape B12567 | Incremental | In progress |
| Lib 45678 (132) Tape X12345 | Lib 67890 (130) Tape B55555 | Deferred [9:00 AM Oct. 10, 2010] | Scheduled |

Backend devices (column 1) are identified by the backend engine 324. The backend engine thereby probes the storage systems via network 206 for example by using prior art SCSI inquiry commands which return the type of storage system and the identifiers.

Tape devices included in tape libraries 130, 132 and 136 are identified by the serial number of the library and the serial number of the drive as shown in row 2 and 4. Disk devices are identified by the world-wide port name (WWPN) of the disk system and the logical unit number (LUN) of the logical disk as shown in row 3.

Frontend devices (column 2) are emulated by the frontend engine 320 to the host systems. There is a unique mapping between frontend and backend devices which is configured by the user via administrative user interface 326. However, not all backend devices must be mapped to frontend devices as shown in row 4. Backend devices which are not mapped may be exclusively used for copy process 400 and/or migration process 600.

Figure 5:
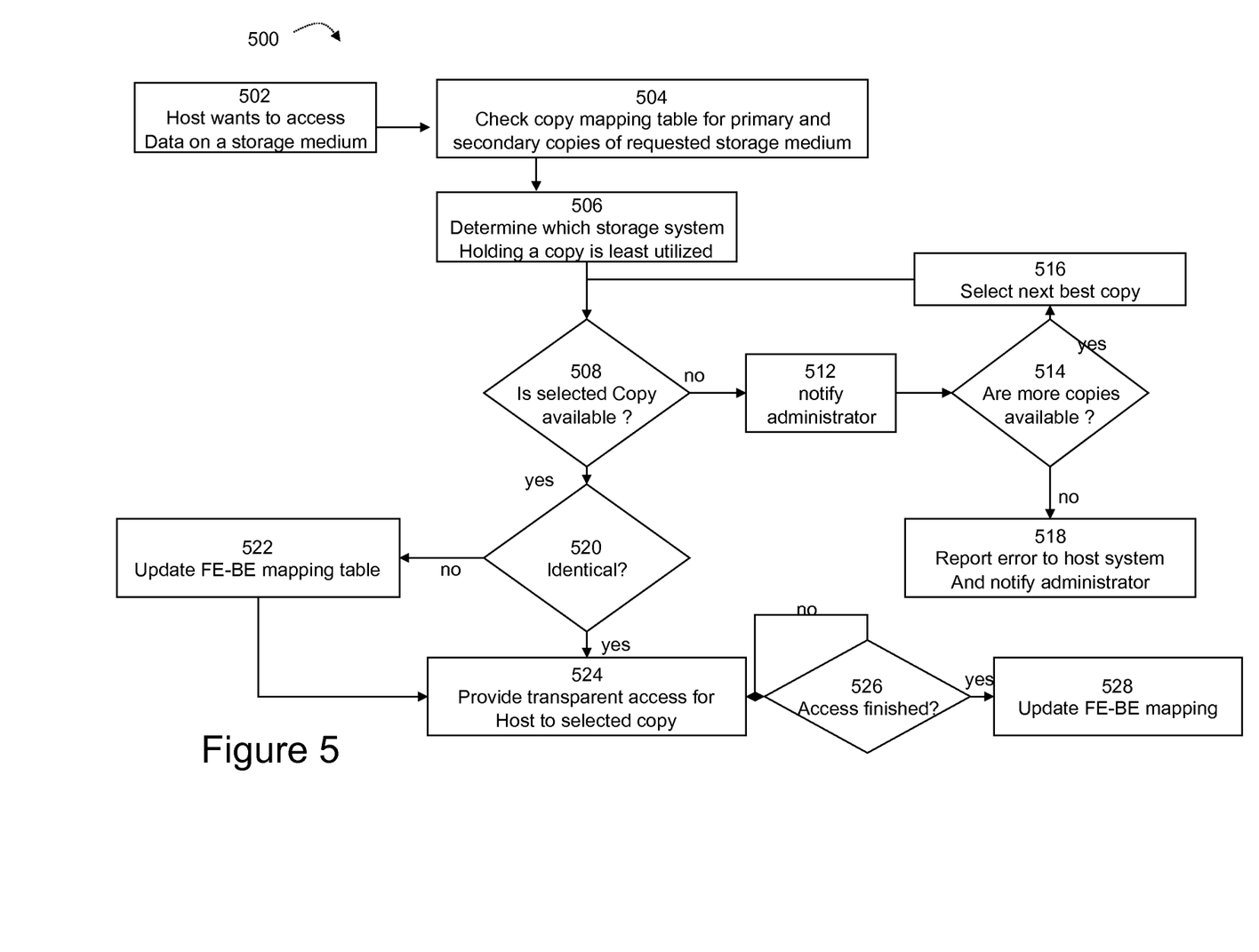
FIG. 5 is a schematic depiction illustrating a load-balancing and high-availability process, according to one embodiment.

For providing means of high-availability and load-balancing there may exist one or more alternative backend devices (column 3) for a frontend-backend mapping entry. An alternative device is used in case the original backend device (column 1) is unavailable or already under a high load. If an alternative device is to be used, the SVS logic 322 forwards all I/O from the fronted device (column 2) to the designated alternative device (column 3), according to the detailed description in process 500, which is described later.

Backend tapes (column 4) are discovered by backend engine 324 using standard SCSI inventory commands. Backend tapes are denoted by a VOLSER which reside in the backend tape library (column 1). All or a subset of tapes in a backend library may be mapped to a frontend library. This allows giving host systems access to a subset of tapes in the backend tape library while other tapes might be used as target tapes for copies which is managed by the SVS logic 322 in conjunction with copy mapping table 340 and migration mapping table 350. For example row 2 shows the tapes with VOLSER A12345-A23456 which are mapped to frontend library with serial number 123456 and which reside in backend library with serial number 123456. Row 4 shows the tapes with VOLSER B10000-B10010 residing in backend tape library 123456 and which are not mapped to the frontend.

The assignment of frontend, backend devices and tapes is done by an administrator which may access the SVS logic 322 via interface 326.

The copy mapping table 340 (Table 2) maps the source storage media to the target storage media including the copy policy and the copy status. A storage media may be a tape in a tape library (130, 132, 136) or it may be a logical disk within a disk system (120, 122, 124):

Column 1 of copy mapping table 340 includes the source storage media. A source storage medium is denoted by a unique identifier. For tapes (row 2, column 1) this is the serial number of the library and the VOLSER of the tape. For logical disks (row 3, column 1) this is the WWPN of the disk system and the LUN of the logical drive.

Column 2 includes the target storage media which may be a tape (row 2, column 2) denoted by the serial of the library and the VOLSER of the tape or a logical disk (row 3, column 2) denoted by the WWPN of the disk system and the appropriate LUN.

Column 3 includes the copy policy which may be one of the following: Always: copy all data from the source storage medium to the target storage medium at any time new data is written to the source storage medium. When full: start the copy process after a source storage medium is written full (e.g. tape is at End of tape this may be determined by a LOGSENSE command to the tape which is mounted; e.g. logical disk has no space left). Incremental: only the blocks which are newly written. This requires memorizing all block addresses which are written. This may be done by intercepting all mount/reserve commands received from the frontend engine for this tape/logical disk while the tape/logical disk was mounted/reserved. Deferred [DATE]: copy at a later point of time; exact time and date when copy will take place is given in parameter [DATE].

Column 4 includes the copy status which may be one of the following: Done: the copy has been done according to the copy policy. Pending: the copy has not been done according to the copy policy. In Progress: The copy is in progress. Scheduled: the copy will take place on date/time given in parameter [DATE] of copy policy for deferred copies For example, according to the second row of table 340, the source storage medium is a tape with VOLSER A12345 in library with serial number 12345 which might be DDE 136 according to FIG. 2. The target medium is a tape with VOLSER B12345 in the library with serial number 67890 which might be PTL 130 according to FIG. 2. The copy policy is set to "When full" which means that the source tape is copied to the target tape when it is full. The copy status is "done" indicating that the copy has been completed.

According to the third row of table 340, the source storage media is a logical disk with LUN 23 on disk system with WWPN 678901 and the target storage medium is a logical disk with LUN 12 on disk system with WWPN 13579. The copy policy is set to "Always" which means that all data is copied to the target storage media. The copy status is "pending" indicating that the copy has not been started yet.

According to the fourth row of table 340, the source storage medium is a logical disk with LUN 3 on disk system with WWPN 798793 and the target storage medium is a tape with VOLSER B12567 in tape library serial number 45678 which might be VTL 132 according to FIG. 2. The copy policy is set to "incremental", which means that all newly written blocks should be copied to the target storage medium. The copy status is "in progress" indicating that the copy is currently taking place.

According to row 5 of table 340 tape with VOLSER X12345 in library 45678, which might be VTL 132, has copy policy deferred with parameter "9:00 AM, Oct. 10, 2010" with status "scheduled". This means tape X12345 will be copied to tape B55555 in library 67890, which might be PTL 130 on Oct. 10, 2010 at 9:00 AM.

People skilled in the art will recognize that more combination of source storage medium types (disk, tape, optical, solid state disk) and target storage medium types (disk, tape, optical, solid state disk), copy policies and copy states are possible.

The migration mapping table 350 (Table 3) maps the source storage media to the migration storage media including the migration policy and the migration status:

TABLE 3

| Source medium | Migration medium | Migration policy | Status |
|---|---|---|---|
| Lib 12345 (136) Tape A12345 | Lib 67890 (130) Tape B12345 | When full | Done |
| WWPN 678901, LUN 23 | WWPN 13579, LUN 12 | After 10 days | Pending |
| WWPN 798793, LUN 3 | Lib 45678 (132) Tape B12567 | When full | In progress |

Similar to copy mapping table 340 the source storage medium (column 1) uniquely identifies a tape in a tape library or a logical disk in a disk system.

Migration storage medium (column 2) specifies the storage medium for the migration which may again be a tape in a tape library or a logical disk in a disk system.

The migration policy (column 3) specifies the condition under which the source storage medium is migrated to a migration destination storage medium. A migration policy may for example be one of the following: When full: perform the migration to the migration storage medium when the source storage medium is full. After x days: perform the migration to the migration storage medium x days after the source storage medium has been written.

The migration status indicates the status of the migration from the source storage medium (column 1) to the migration storage medium (column 2). The status may be one of the following: Done: the migration has been finished according to the migration policy. Pending: the migration has not been started according to the migration policy. In Progress: The migration is in progress.

For example, according to the second row of migration mapping table 350, the source storage medium is a tape with VOLSER A12345 in library with serial number 12345 which might be DDE 136 according to FIG. 2. The migration storage medium is a tape with VOLSER B12345 in library with serial number 67890 which might be PTL 130 according to FIG. 2. The migration policy is set to "When full" which means that the source tape is migrated to the target tape when it is full. The migration status is "done" indicating that the migration been completed.

According to the third row of table 350, the source storage medium is a logical disk with LUN 23 on disk system with WWPN 678901 and the migration storage medium is a logical disk with LUN 12 on disk system with WWPN 13579. The migration policy set to "After 10 days" which means that all data of the source disk is migrated to the migration disk 10 days after data has been written to the source disk. The migration status is "pending" indicating that the migration has not been started yet.

According to the fourth row of table 350, the source storage medium is a logical disk with LUN 3 on disk system with WWPN 798793 and the migration storage medium is a tape with VOLSER B12567 in tape library serial number 45678 which might be VTL 132 according to FIG. 2. The migration policy is set to "When full" which means that the data of the source disk is migrated to the target tape when the source disk is full. The migration status is "in progress" indicating that the migration is currently taking place.

People skilled in the art will recognize that more combination of source storage medium types (disk, tape, optical, solid state disk) and target storage medium types (disk, tape, optical, solid state disk), copy policies and copy states are possible.

People skilled in the art will recognize that copy mapping table 340 and migration mapping table 350 may be combined into one table. This is particularly advantageous if the target storage media for the copy (column 2 of table 340) is the same as the migration storage media (column 2 of table 350) because in this case the migration does not require any data movement.

The SVS 202 and in particular the SVS logic 322 in conjunction with backend engine 324 and frontend engine 320 and the copy mapping table 340 provides a automated method for copying source storage media to target storage media. This assumes that an administrator has configured copy policies via interface 326 which are stored in copy mapping table 340. The copy process 400 is explained in FIG. 4.

Figure 4:
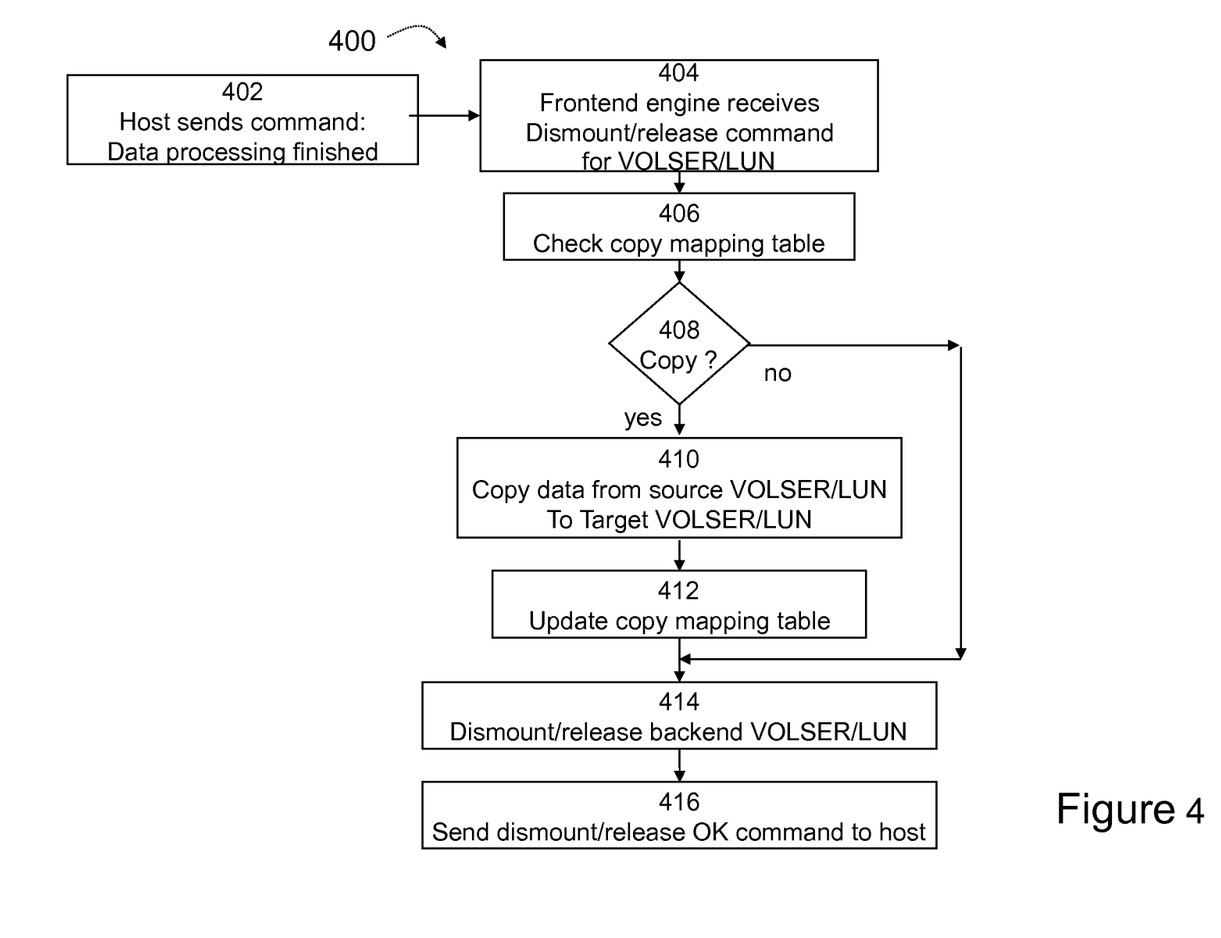
FIG. 4 is a schematic depiction illustrating a copy process, according to one embodiment.

A typical copy process begins (step 402), when a host system has finished writing to a specific storage medium such as on a tape or a logical disk. The host system sends a dismount/release command (in a tape environment this is a dismount command, in a disk environment this is a release command). The SVS receives this command through its frontend engine 320 (step 404) and intercepts the command for subsequent processing.

The process checks the copy mapping table 340 (step 406) if a copy policy (column 3) for the source storage medium exists (step 408). A tape is denoted by a VOLSER and a library ID and a logical disk is denoted by the WWPN of the disk system and the logical unit number. If a copy policy exists, the process determines the target medium (column 2 in copy-mapping-table 340). Then it copies the data from the previously written source medium to the target medium according to the copy policy (step 410).

In particular if the copy policy is "incremental", only the data that was written through the last session is copied and appended on the target copy.

If the copy policy is "when full", a storage medium may be loaded and written multiple times and is only copied when the storage medium is written completely full.

Copy policy "always" copies the whole tape after every write session.

If the copy policy is deferred the copy is scheduled for a given time/day. The information, when a copy will take place is given by the [DATE]-parameter. The SVS logic 322 subsequently checks if there are scheduled copy jobs to be executed.

The process updates the copy mapping 340 table column 4 with the status of the copy process (step 412) and dismounts/releases both source and target storage medium (step 414). If the dismount/release finishes successful, the process reports a successful dismount/release to the host system (step 416).

The SVS 202 and in particular the SVS logic 322 in conjunction with backend 324 and frontend engine 320, the copy mapping table 340 and the frontend-backend mapping table 330 provides a process 500 for providing high availability and load balancing. The load-balancing and high availability process 500 is explained in FIG. 5.

The process starts when a host system (102, 104, 106, 108 in FIG. 2) wants to access (read/write) data on a storage medium (step 502). The access to the storage medium is indicated by a command sent from a host system to the SVS 202 (FIG. 2).

More particular, if the storage medium is a tape the host system sends a SCSI mount command which instructs the corresponding tape library emulated by the frontend engine to mount the tape into a tape drive. If the storage medium is a logical disk the data access is either indicated by a SCSI reserve command or by a SCSI read or write command. The command is received and intercepted by the frontend engine 320 of SVS 202 and passed on to the SVS logic 322 running process 500.

The process uses the copy mapping table 340 column 2 to determine, how much copies of the storage medium exist (step 504) and in which backend storage system they reside. The number of copies is denoted by the number of storage media entries in column 2 of copy mapping table 340.

The process 500 then checks which storage system holding a copy of the storage medium is least utilized (step 506). This is done by checking how much backend devices of the backend storage system are currently in use, for example how much tapes are mounted in a tape library.

The storage medium copy in the least utilized storage system is selected and the backend engine 324 (FIG. 3) is instructed to test the access to the copy (step 508) by issuing a mount/reserve command to the appropriate backend device. If the copy is available, the process proceeds to step 520 which is explained later.

Otherwise the process flows to step 512 where the SVS logic 322 notifies the administrator of an inaccessible storage media copy and checks for the availability of more copies (step 514) using the copy mapping table, step 514.

If more copies are available in step 514 the process selects the next copy of the storage medium (step 516) and tests this also for availability (step 508). If no additional copy is available in step 514, the process reports an error to the host system which requested the access in step 502 and notifies the administrator about the problem (step 518).

In step 520, the process uses the frontend-backend mapping table 330 column 1 and 2 to check if the selected backend storage system (from step 506) is identical to the frontend storage system which received the data access command in step 502. If the storage system is identical then the process continues to step 524. Otherwise, if the storage system is not identical the process proceeds to step 522 and updates the frontend-backend mapping table column 3 with the selected backend storage system identifier and proceeds to step 524.

In step 524, the process provides transparent access for the host system to the selected the storage medium holding a copy of the data, independent which storage medium was addressed by the host system in step 502. Subsequently, SVS logic 322 forwards all commands received via the frontend engine for the storage medium/device addressed in step 502 to the selected storage medium according to the frontend-backend mapping table 330 column 3.

In step 526, the process checks if the data access to the frontend storage medium/device has finished by the host system. For example, in a tape environment the host has sent a dismount command, in a disk environment the host has sent a release command or the read or write command has finished.

If the answer in step 526 is yes then the process continues to step 528 where the frontend-backend mapping table 330 is updated in column 3. Thereby the entry from this column 3—added in step 522—is removed. Otherwise, if the answer in step 526 is no the process flows back to step 526 where is checks again if the access has completed.

The SVS system 202 and in particular the SVS logic 322 in conjunction with backend engine 324 and frontend engine 320 and the migration mapping table 350 and the copy mapping table 340 provides a method for migrating source storage media to migration storage media. This assumes that the administrator has configured migration policies via interface 326 which are stored in migration mapping table 350. The migration process 600 is explained in FIG. 6.

Figure 6:
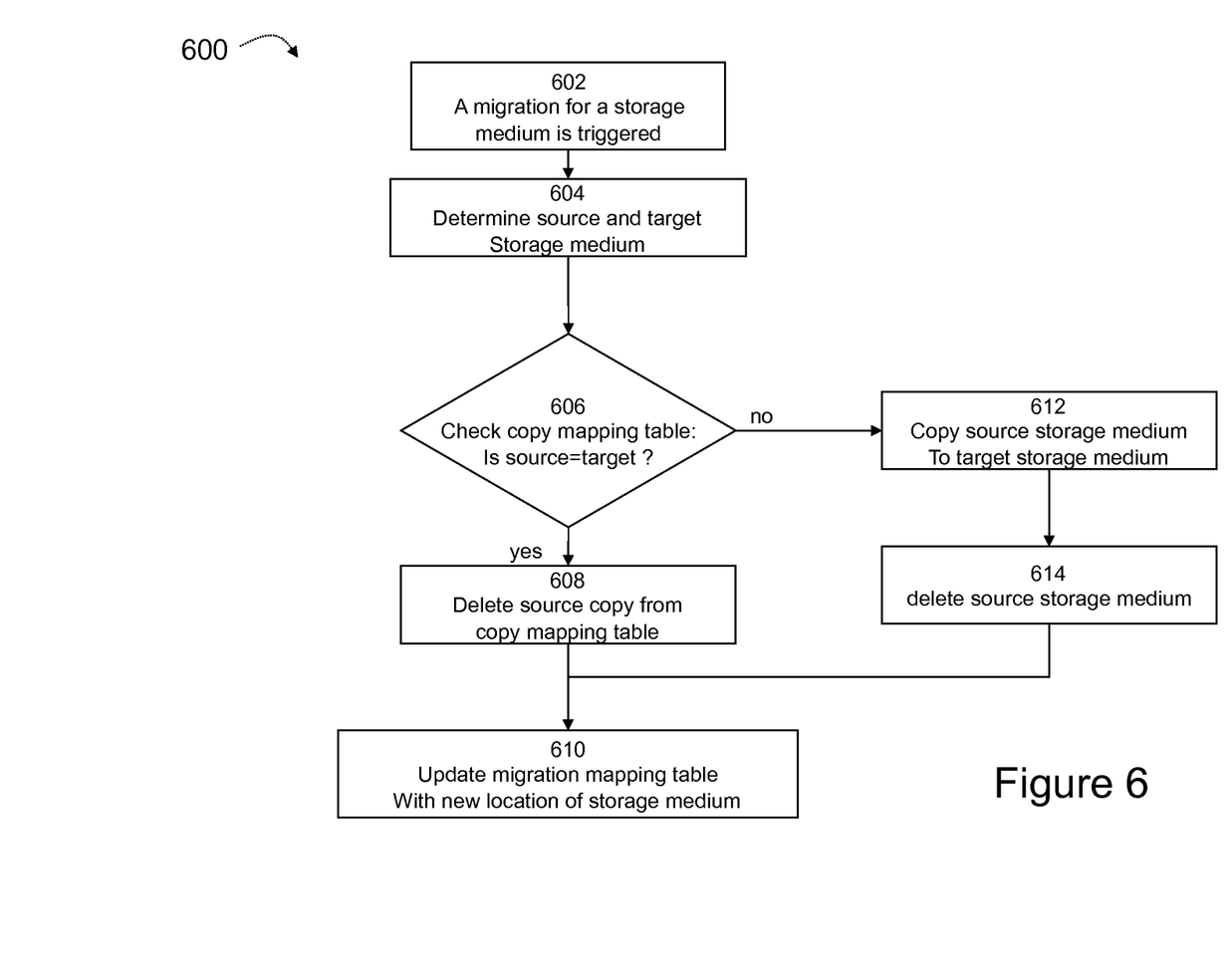
FIG. 6 is a schematic depiction illustrating a migration process, according to one embodiment.

A migration process 600 is triggered by a migration policy in column 3 of table 350 in step 602. The migration policy is a condition which may be based on time, e.g. by schedules or events e.g. if a source storage medium is written full. The process periodically checks the migration policies in order to trigger the migration. When a migration is triggered, the process determines the source storage medium and the migration storage medium (step 604). Then the process checks if the source storage medium already has a copy on the migration storage medium by checking the copy mapping table 340 column 1, 2 and 4 (step 606). If a copy of the source storage medium already exist on the migration storage medium, the process deletes the target medium from column 2 of copy mapping table 340 (step 608) and updates the migration mapping table 350 column with the status of done in step 610.

If the source medium does not have a copy on the migration medium in step 606 the process copies the source storage medium to the migration storage medium (step 612) and subsequently deletes the source storage medium (step 614) and updates the migration mapping table 350 column 4 with the status done (step 610).

For subsequent data access commands the SVS logic 322 checks the migration mapping table 350 to determine if a source storage medium (column 1) has been migrated (column 4) to a migration storage medium (column 2). If this is the case the SVS logic 322 provides transparent access to the migration storage medium whenever the source storage medium is requested for access by the host system.

People skilled in the art will appreciate that the present invention advantageously extends the prior art possibilities of combined tape and disk storage managing in regards of high availability, load-balancing, data backup and data migration.

The invention may take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium (having executable portions) providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for virtualizing and managing a storage virtualization system (SVS) in a storage management architecture, the SVS being connected to one or more storage systems, the one or more storage system comprising a plurality of storage media, the method comprising:
   upon completion of write operations to a source storage media, copying source data from the source storage media to target data in a target storage media based on a predefined copy policy in a copy mapping table;
   upon completion of the copying of the source data, tracking a relation between the source data and the target data in a copy mapping table;
   upon reception of a read command for requested data to a requested storage media, determining if a copy of the requested data exists using the copy mapping table;
   determining a least utilized storage system which holds a copy of the requested storage media;
   responsive to the determination of the least utilized storage system, testing access to the requested storage media in the least utilized storage system; and
   if access to the requested storage media in the least utilized storage system is not possible, providing access to a copy of the requested storage media in another storage system by updating a frontend-backend mapping table and forwarding all data access commands to the other storage system.

2. The method of claim 1, further comprising:
   configuring tiered storage policies in a migration mapping table pertaining to the SVS;
   mapping a source storage media to a target storage media and a migration policy; and
   determining if a migration policy condition is true.

3. The method of claim 2, further comprising:
   responsive to the migration policy condition, determining the source storage media and a migration storage media; and
   determining if a copy relation between source storage media and migration storage media exists using the copy mapping table.

4. The method of claim 3, further comprising:
   if the copy relation exists, removing the source storage media from the copy mapping table; and
   if the copy relation does not exist, copying the source data of the source storage media to the migration storage media and removing the source data on the source storage media and updating the migration mapping table.

5. A data processing system for virtualizing and managing a storage virtualization system (SVS) in a storage management architecture, the SVS being connected to one or more storage systems, the one or more storage system comprising a plurality of storage media, the data processing system comprising:
   at least one processor device, operable in the storage management architecture, wherein the at least one processor device is adapted for:
      upon completion of write operations to a source storage media, copying source data from the source storage media to target data in a target storage media based on a predefined copy policy in a copy mapping table;
      upon completion of the copying of the source data, tracking a relation between the source data and the target data in a copy mapping table;
      upon reception of a read command for requested data to a requested storage media, determining if a copy of the requested data exists using the copy mapping table;
      determining a least utilized storage system which holds a copy of the requested storage media;
      responsive to the determination of the least utilized storage system, testing access to the requested storage media in the least utilized storage system; and
      if access to the requested storage media in the least utilized storage system is not possible, providing access to a copy of the requested storage media in another storage system by updating a frontend-backend mapping table and forwarding all data access commands to the other storage system.

6. The data processing system of claim 5, wherein the at least one processor is further adapted for:
   configuring tiered storage policies in a migration mapping table pertaining to the SVS;
   mapping a source storage media to a target storage media and a migration policy; and
   determining if a migration policy condition is true.

7. The data processing system of claim 6, wherein the at least one processor is further adapted for:
responsive to the migration policy condition, determining the source storage media and a migration storage media; and
determining if a copy relation between source storage media and migration storage media exists using the copy mapping table.

8. The data processing system of claim 7, wherein the at least one processor is further adapted for:
if the copy relation exists, removing the source storage media from the copy mapping table; and
if the copy relation does not exist, copying the source data of the source storage media to the migration storage media and removing the source data on the source storage media and updating the migration mapping table.

9. A computer program product virtualizing and managing a storage virtualization system (SVS) in a storage management architecture, the SVS being connected to one or more storage systems, the one or more storage system comprising a plurality of storage media, the computer program product comprising a computer-readable storage medium having computer-readable program code portions stored therein, the computer-readable program code portions comprising:
a first executable portion for, upon completion of write operations to a source storage media, copying source data from the source storage media to target data in a target storage media based on a predefined copy policy in a copy mapping table;
a second executable portion for, upon completion of the copying of the source data, tracking a relation between the source data and the target data in a copy mapping table;
a third executable portion for, upon reception of a read command for requested data to a requested storage media, determining if a copy of the requested data exists using the copy mapping table;
a fourth executable portion for determining a least utilized storage system which holds a copy of the requested storage media;
a fifth executable portion for, responsive to the determination of the least utilized storage system, testing access to the requested storage media in the least utilized storage system; and
a sixth executable portion for, if access to the requested storage media in the least utilized storage system is not possible, providing access to a copy of the requested storage media in another storage system by updating a frontend-backend mapping table and forwarding all data access commands to the other storage system.

10. The computer program product of claim 9, further comprising:
a seventh executable portion for configuring tiered storage policies in a migration mapping table pertaining to the SVS;
an eighth executable portion for mapping a source storage media to a target storage media and a migration policy; and
a ninth executable portion for determining if a migration policy condition is true.

11. The computer program product of claim 10, further comprising:
a tenth executable portion for, responsive to the migration policy condition, determining the source storage media and a migration storage media; and
an eleventh executable portion for determining if a copy relation between source storage media and migration storage media exists using the copy mapping table.

12. The computer program product of claim 11, further comprising:
a twelfth executable portion for, if the copy relation exists, removing the source storage media from the copy mapping table; and
a thirteenth executable portion for, if the copy relation does not exist, copying the source data of the source storage media to the migration storage media and removing the source data on the source storage media and updating the migration mapping table.

13. A data processing system for virtualizing and managing a storage virtualization system (SVS) in a storage management architecture comprising one or more host systems connected to the SVS, the SVS being connected to one or more storage systems, the one or more storage system comprising a plurality of storage media, the data processing system comprising:
a SVS located in the data path between the one or more host systems and the one or more storage systems;
means for managing a frontend-to-backend mapping table, the frontend-to-backend mapping table mapping backend resources to frontend resources;
means for managing a copy mapping table, the copy mapping table mapping a primary storage media to one or more secondary storage media and a copy policy where a storage media is identifiable by a serial number, a logical disk is identifiable by a logical unit number physically represented by one or more hard disks or solid state disks, or an optical disk is identifiable by a unique volume identifier; and
means for managing a migration mapping table, the migration mapping table mapping a source storage media to a migration storage media and a migration policy.

* * * * *